US008173251B2

United States Patent
Omura et al.

(10) Patent No.: US 8,173,251 B2
(45) Date of Patent: May 8, 2012

(54) GASKET MATERIAL COMPRISING A METAL PLATE AND A FLUORINE RUBBER LAYER HAVING A SPECIFIC VICKERS HARDNESS

(75) Inventors: Atsushi Omura, Shizuoka (JP); Kenichiro Ishikawa, Shizuoka (JP); Tetsuo Ohinata, Shizuoka (JP)

(73) Assignee: Nichias Corporation, Tokyo (JP)

( * ) Notice: Subject to any disclaimer, the term of this patent is extended or adjusted under 35 U.S.C. 154(b) by 101 days.

(21) Appl. No.: 12/764,304

(22) Filed: Apr. 21, 2010

(65) Prior Publication Data

US 2010/0266839 A1      Oct. 21, 2010

(30) Foreign Application Priority Data

Apr. 21, 2009   (JP) .............................. P.2009-102861

(51) Int. Cl.
    B32B 5/16       (2006.01)
    B32B 27/06      (2006.01)
(52) U.S. Cl. ....................... 428/323; 428/421
(58) Field of Classification Search ................... 428/323
    See application file for complete search history.

(56) References Cited

U.S. PATENT DOCUMENTS

| 5,695,203 A * | 12/1997 | Udagawa ...................... 277/595 |
| RE37,022 E * | 1/2001 | Sugiyama et al. ............. 524/463 |
| 2003/0118765 A1 * | 6/2003 | Govaerts et al. ........... 428/36.91 |
| 2008/0107905 A1 * | 5/2008 | Odagawa et al. .............. 428/421 |
| 2011/0009568 A1 * | 1/2011 | Okazaki et al. ............ 525/326.3 |

FOREIGN PATENT DOCUMENTS

| JP | 3620685 | 11/2004 |
| JP | 3840475 | 8/2006 |
| WO | WO 2009/116451 | * 9/2009 |

OTHER PUBLICATIONS

English translation of JP 2004-137386, Ikuta, May 2004.*

* cited by examiner

*Primary Examiner* — Hoa (Holly) Le
*Assistant Examiner* — Ronak Patel
(74) *Attorney, Agent, or Firm* — Nixon & Vanderhye P.C.

(57) ABSTRACT

A gasket material including: a metal plate; and a fluorine rubber layer having a Vickers hardness of 15 to 30 N/mm$^2$, being provided on one side or both sides of the metal plate, and obtained from a fluorine rubber composition containing a fluorine rubber polymer. The gasket material maintains a sealing bead surface at a high surface pressure without changing the engine block design and the gasket design and also possible to absorb flange surface roughness that is an original purpose of the rubber layer.

2 Claims, 1 Drawing Sheet

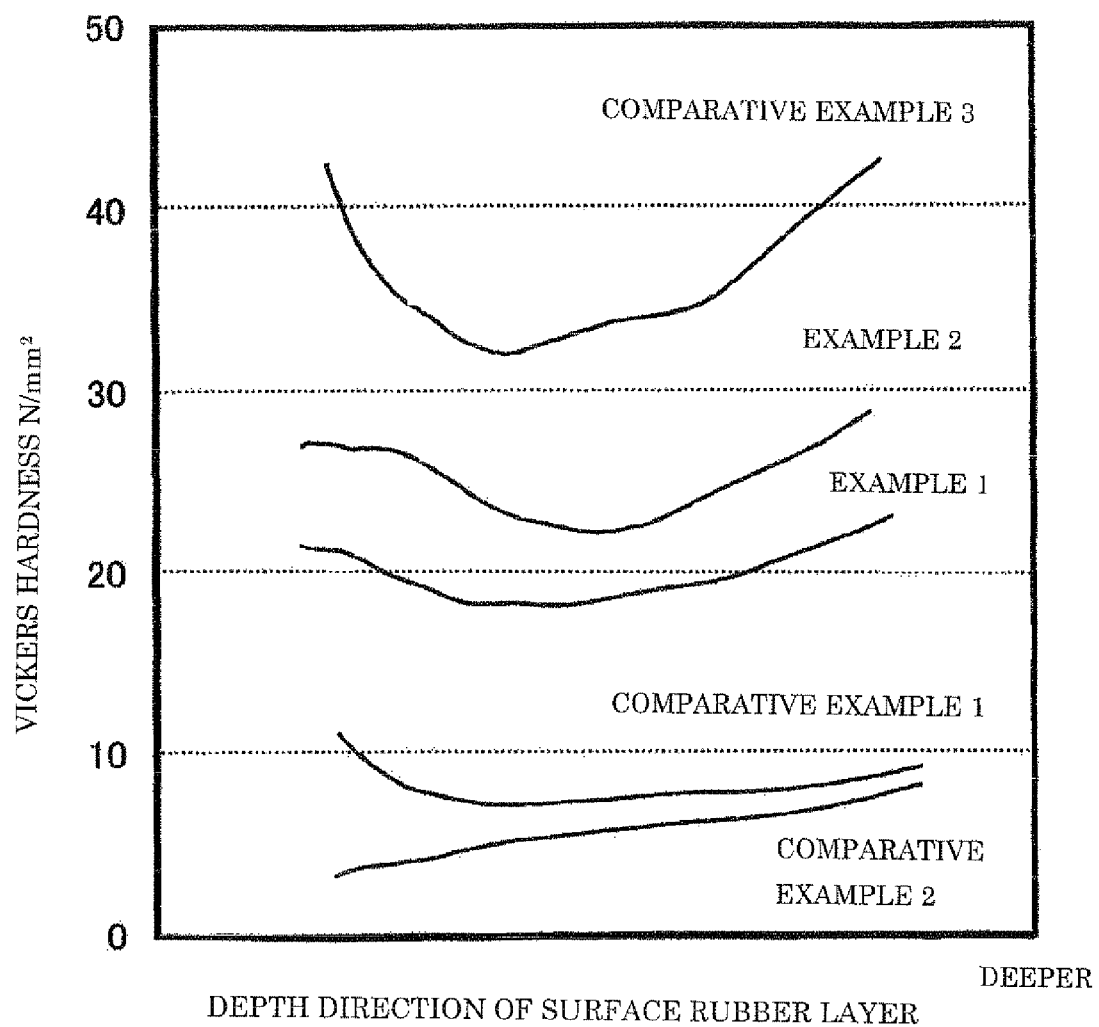

GASKET MATERIAL COMPRISING A METAL PLATE AND A FLUORINE RUBBER LAYER HAVING A SPECIFIC VICKERS HARDNESS

FIELD OF THE INVENTION

The present invention relates to a head gasket material to be mounted on an engine for automobiles.

BACKGROUND OF THE INVENTION

Recently, attention has been paid to conservation of global environment and thus the prevention of global warming ($CO_2$ reduction) has been demanded. For the $CO_2$ reduction, each automobile manufacturer has been pursuing improvement of fuel efficiency in gasoline-powered vehicles and development of fuel-efficient diesel-powered vehicles.

As a method for improving fuel efficiency, weight saving is aimed at by changing the material of an engine block from cast iron to an aluminum material having a small specific gravity or by thinning the wall of the engine block. However, as a trade-off of the weight saving, a load on the engine block increases and hence vibration during engine running and strain deformation are generated to frequently result in occurrence of problems such as insufficient sealing.

On the one hand, the improvement of fuel efficiency has been pursued through increase of combustion pressure in the engine but the load on the engine block more increases and furthermore thermal resistance is also required.

In order to solve the above problems, hitherto, a fastening force is increased to restrict the movement of the engine block, thereby reducing the vibration and the strain deformation. For example, the problems are coped with through increase in fastening axial force with bolts, increase in bead height of the gasket, change in laminated structure of the gasket, and the like (see Patent Documents 1 and 2).

Patent Document 1: Japanese Patent No. 3840475
Patent Document 2: Japanese Patent No. 3620685

SUMMARY OF THE INVENTION

However, in the design of the engine block, since an aluminum material has a low rigidity and hence is deformed to a large extent directly beneath a fastening bolt, there is a limit to increase the fastening force. Moreover, the increase in bead height as a gasket design results in generation of bead fatigue, difficulty in balancing surface pressure, necessity of high-precision mold design, and the like, so that costs and time are required. Furthermore, when a rubber layer on the surface of the gasket is too soft, compression deformation (sag) occurs at high surface pressure to cause decrease in surface pressure.

In order to solve the above problems, an object of the present invention is to provide a gasket material capable of maintaining a sealing bead surface at a high surface pressure without changing the engine block design and the gasket design and also capable of absorbing flange surface roughness that is an original purpose of the rubber layer.

Namely, the present invention relates to the following (1) to (4).

(1) A gasket material including:
a metal plate; and
a fluorine rubber layer having a Vickers hardness of 15 to 30 $N/mm^2$, being provided on one side or both sides of the metal plate, and being obtained from a fluorine rubber composition containing a fluorine rubber polymer.

(2) The gasket material according to (1), in which the fluorine rubber composition further contains a polyol compound as a crosslinking agent in an amount of 3 to 6 parts by weight based on 100 parts by weight of the fluorine rubber polymer.

(3) The gasket material according to (1) or (2), in which the fluorine rubber composition further contains 30 to 70 parts by weight of carbon black having an average particle diameter of 25 to 80 nm, 3 to 10 parts by weight of magnesium oxide, 10 to 30 parts by weight of calcium hydroxide, 20 to 50 parts by weight of calcium carbonate, and 2 to 5 parts by weight of an amine-based silane coupling agent based on 100 parts by weight of the fluorine rubber polymer.

(4) The gasket material according to any one of (1) to (3), in which the fluorine rubber polymer has a Mooney viscosity (100° C.) of 50 to 120.

Since the gasket material of the invention has a fluorine rubber layer having a specific Vickers hardness, rubber flow is not observed, surface pressure can be increased, and further flange surface roughness can be absorbed as an original function of the rubber layer, so that insufficient sealing is avoided.

BRIEF DESCRIPTION OF THE DRAWINGS

FIG. 1 is a graph showing Vickers hardness of the rubber layer obtained in Examples in a depth direction.

DETAILED DESCRIPTION OF THE INVENTION

The following will describe the invention in detail.

The gasket material of the invention comprises a metal plate and a fluorine rubber layer having a Vickers hardness of 15 to 30 $N/mm^2$ formed on one side or both sides of the metal plate. As the elastic modulus of the rubber layer increases, the surface pressure directly above a bead processed on a gasket can be increased without increasing fastening axis force when fastened with an aluminum block. With the increase in the surface pressure, the vibration during engine running and the deformation of the engine block can be reduced. However, when Vickers hardness exceeds 30 $N/mm^2$, the function of absorbing the flange surface roughness decreases to a large extent and thus insufficient sealing of the contact face occurs. Moreover, when Vickers hardness is less than 15 $N/mm^2$, the compression deformation (sag) of the rubber is caused by the fastening load, so that there is a concern that insufficient sealing occurs due to decrease in surface pressure. More preferred Vickers hardness is 15 to 20 $N/mm^2$.

As the metal plate, there can be used plate materials hitherto used as gasket materials, such as (ferrite-based/martensite-based/austenite-based stainless steel plates), an SPCC steel plate, and an aluminum steel plate. Usually, these plate materials are used after treated with an alkaline degreasing and a chemical conversion coating for forming a rust proof coating using a chromate finishing agent, a non-chromate finishing agent, or the like, and the same treatments may be also performed in the present invention. Moreover, in the case of SPCC steel plate, a zinc phosphate coating or a phosphoric acid coating is formed in some cases. Also, in the invention, the same coating may be formed. Moreover, a plate material having its surface roughened by shot blast or scotch blast can be also employed.

The fluorine rubber layer is obtained from a fluorine rubber composition and the fluorine rubber composition contains a fluorine rubber polymer. The fluorine rubber layer is crosslinked and examples of the crosslinking form thereof include polyol crosslinking, amine crosslinking and peroxide crosslinking. Of these, the polyol crosslinking is preferred because it is excellent in thermal resistance and compression set resistance. The kind of the fluorine rubber polymer may be any of binary and ternary polymers. Also, as the fluorine rubber polymer, a polymer having a higher elastic modulus is preferred and a polymer having a large molecular weight, specifically a Mooney viscosity (100° C.) of about 50 to 120, is desirable.

As a crosslinking agent for the polyol crosslinking, a polyol compound may be used. Examples of the polyol compound include bisphenol AF and bisphenol AP-AF. Of these, bisphenol AF is preferably used. The polyol compound is desirably blended in a large amount in order to make the fluorine rubber polymer itself have a high elasticity and is desirably blended in an amount of 2 to 10 parts by weight based on 100 parts by weight of the fluorine rubber polymer. However, since the polyol compound itself has a lower thermal resistance than the fluorine rubber polymer, the amount thereof is desirably 3 to 6 parts by weight in the case where the thermal resistance is considered.

As a crosslinking accelerator, a quaternary ammonium salt or a quaternary phosphonium salt can be used. Examples of the quaternary ammonium salt include cetyltrimethylammonium salts, cocoalkyltrimethyl ammonium salts, stearyltrimethylammonium salts, behenyltrimethylammonium salts, cocobenzyldimethylammonium salts, didecyldimethylammonium salts, dicocoyldimethylammonium salts, distearyldimethylammonium salts, dioleyldimethylammonium salts, oleylbis(2-hydroxyethyl)methylammonium salts, DBU-phenol salts, DBU-octylate salt, DBU-toluenesulfonate salt, DBU-formate salt, and DBN-octylate salt. Examples of the quaternary phosphonium salt include tributylphosphonium salts, tetraphenylphosphonium salts, methyltriphenylphosphonium salts, ethyltriphenylphosphonium salts, n-butyltriphenylphosphonium salts, methoxymethyltriphenylphosphonium salts, and benzyltriphenylphosphonium salts. The blending amount thereof is not particularly limited and the crosslinking accelerator is added in an appropriate amount so as to achieve a crosslinking rate which matches with production conditions.

Moreover, as a crosslinking acceleration assistant, magnesium oxide and calcium hydroxide can be used. The blending amount thereof is preferably 3 to 10 parts by weight of magnesium oxide and 10 to 30 parts by weight of calcium hydroxide based on 100 parts by weight of the fluorine rubber polymer. The control of the crosslinking rate can be effected by increasing the amount of the crosslinking acceleration assistant but when the crosslinking acceleration assistant is blended in a larger amount than the above-described blending amount, anti-freezing fluid resistance and water-resistant adhesion property become worse. Also, rubber elastic modulus can be increased by increasing the amount of calcium hydroxide. Furthermore, in consideration of dispersibility at rubber kneading, calcium hydroxide is desirably subjected to a surface treatment.

The fluorine rubber layer preferably contains carbon black and calcium carbonate, for reinforcement. The carbon black has preferably has an average particle diameter of 25 to 80 nm and may be any of SRF, FT, FEF, MAF, and HAF. It is also possible to use MT carbon having an average particle diameter exceeding 80 nm but, in order to obtain tensile strength and elastic modulus similar to those of the above-described carbon black, it is necessary to be a highly packed blend and it becomes difficult to perform rubber kneading. Moreover, in the case of carbon black such as ISAF having an average particle diameter less than 25 nm, dispersion becomes insufficient at rubber kneading and the carbon black is unevenly distributed in the fluorine rubber layer as large lumps, so that strength becomes partially insufficient and the sealing property is lowered. The blending amount thereof is desirably 30 to 70 parts by weight based on 100 parts by weight of the fluorine rubber polymer depending on the average particle diameter of the carbon black. When the amount exceeds 70 parts by weight, insufficient dispersion occurs at rubber kneading and when the amount is less than 30 parts by weight, a reinforcing effect is insufficient.

Moreover, as calcium carbonate, precipitated calcium carbonate and heavy calcium carbonate can be used but precipitated calcium carbonate having a small average particle diameter is preferred. Calcium carbonate becomes alkaline by the influence of calcium hydroxide slightly present at the production and is a filler that does not inhibit the crosslinking reaction, so that calcium carbonate can be blended in a large amount. However, in order not to reduce the property of reinforcing the rubber and the abrasion resistance of the rubber, calcium carbonate having an average particle diameter of 1 µm or less, which can be used as a semi-reinforcing agent, is desirable. Moreover, the blending amount of calcium carbonate is preferably 20 to 50 parts by weight based on 100 parts by weight of the fluorine rubber polymer. When the amount exceeds 50 parts by weight, insufficient dispersion of the fluorine rubber composition occurs at rubber kneading. When the amount is less than 20 parts by weight, a reinforcing effect is insufficient.

Also, calcium carbonate is preferably surface-treated in order to improve the dispersibility at rubber kneading. As a method for the surface treatment, a surface treatment with a silane coupling agent, a resin acid, an aliphatic acid, or the like is preferred and a surface treatment with an amine-based silane coupling agent is particularly preferred. An amine crosslinking can be also expected by using the amine-based silane coupling agent and further the fluorine rubber layer can be made to have a high elastic modulus by strengthening the bond between the fluorine rubber polymer and the filler. In addition, adhesiveness to the stainless steel plate can be improved. On the other hand, even when a silane coupling agent such as a mercaptosilane or a vinylsilane is used, the coupling agent does not contribute crosslinking and such a large effect that the fluorine rubber layer is made to have a high elastic modulus cannot be expected. However, there is a trade-off that the amine-based silane coupling agent deteriorates adhesiveness such as water resistance, which is induced by hydrolysis. Therefore, the agent is desirably added in an appropriate amount, the amount being most preferably 2 to 5 parts by weight based on 100 parts by weight of the fluorine rubber polymer. In this regard, examples of the amine-based silane coupling agent include 3-triethoxysilyl-N-(1,3-dimethyl-butylidene)propylamine, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, and N-phenyl-γ-aminopropyltrimethoxysilane.

Other than the above-described blending components, it is possible to use white carbon, talc, clay, or the like as a filler. However, since these fillers have a large number of hydroxyl groups on their surface, they show a high acidity and thus may be a factor of inhibiting the crosslinking reaction. Therefore, since there is a concern of deterioration of physical properties owing to the crosslinking inhibition, when such a filler is used, it is desirable to control pH to a range of 10 to 11 by a surface treatment or the like.

For producing the gasket material of the invention, the above-described blending components are kneaded to prepare a uncrosslinked fluorine rubber composition and a rubber solution obtained by dissolving or dispersing the fluorine rubber composition in an organic solvent is applied by means of a knife coater or a roll coater or by screen printing or the like and then crosslinked through a heating treatment to form a fluorine rubber layer.

The kneading method is not limited and a twin-screw open roll, a pressure kneader, a Banbury mixer, or the like can be used. However, in the case of kneading a fluorine rubber composition containing large amount of the filler, since a fluorine rubber composition excellent in dispersibility is not obtained by using only a pressure kneader, a Bunbury mixer, or the like, it is preferred that a kneader or a Bunbury mixer is used as primary processing and then kneading is performed in the open roll as finish processing.

The organic solvent is not limited as far as it can dissolve the fluorine rubber composition but a ketone-based organic solvent such as methyl ethyl ketone, methyl propyl ketone, methyl butyl ketone, methyl isobutyl ketone, or diisobutyl ketone is appropriate. Moreover, the fluorine rubber composition is preferably contained in a ratio of 10 to 40% by mass based on the total amount of the rubber solution when coating ability is considered.

In the above-described production method, in order to improve adhesiveness between the metal plate and the fluorine rubber layer, it is preferred to perform the application after the metal plate is subjected to a treatment with a phenol-based primer. Moreover, the thickness of the fluorine rubber layer after drying is appropriately 15 to 30 μm and the solution is applied so as to achieve such a dry thickness. With regard to heating conditions, it is preferred to maintain heating at 150 to 200° C. for 5 to 30 minutes for good crosslinking.

EXAMPLES

The following will illustrate the present invention with reference to Examples and Comparative Examples, but it should be understood that the invention is not to be construed as being limited thereto.

Sample Preparation

As shown in Table 1, respective components were blended to prepare a fluorine rubber composition, which was then dissolved in a mixed solvent of methyl ethyl ketone and methyl isobutyl ketone so that solid matter concentration was about 25%, thereby preparing a rubber solution. In this regard, the unit of numerals of the blend components is part(s) by weight.

After a non-chromate finished stainless steel was subjected to a primer treatment, the rubber solution was applied thereon by means of a roll coater so that the rubber thickness after drying was about 25 μm. Then, the solution was pre-dried at 100° C. for 10 minutes and an adhesion preventive coating was applied on the surface of the rubber layer. Thereafter, the whole was subjected to a thermal treatment at 200° C. for 20 minutes to prepare a sample.

Evaluation Methods (1) Measurement of Rubber Hardness

The rubber hardness was evaluated as Vickers hardness for which measurement was performed in a push-in depth direction. As the evaluation method, a diamond-made probe having a quadrilateral pyramidal end shape was pushed into the surface of the rubber layer and the obtained load was divided by the surface area of the probe, thereby calculating a hardness value (N/mm$^2$).

(2) Measurement of Surface Pressure

With regard to the measurement of the surface pressure, the sample was embossed so as to be a width of 2.5 mm and a height of 0.2 mm to prepare a bead. Then, the sample was sandwiched between flanges together with a pressure-sensitive paper and was fastened at a predetermined fastening load and the surface pressure was measured.

(3) Sealing Property

The above-described bead-formed sample was fastened with an aluminum flange having a surface roughness of 12.5 z so that the surface pressure directly above the bead was 30 MPa. Then, air was loaded at a predetermined pressure as an inner pressure. At that time, soap water was sprayed on the outer periphery of the flange and a leak was visually confirmed. In this regard, the surface pressure of 30 MPa is a required surface pressure for an outer peripheral sealing portion which seals engine oil and antifreezing fluid.

(4) Sag Property

The sample was loaded at a surface pressure of 150 MPa which corresponds to a bore load of an engine. After the sample was maintained at 150° C. for 24 hours, a sag property of the rubber layer was evaluated. At that time, a protruded amount of the rubber from the base material was visually judged and the sample was evaluated as "Good" when no protrusion was observed and as "Bad" when protrusion was observed.

Results

The test results are shown in Table 1. Also, Vickers hardness in a thickness direction (deeper with the approach to the right end) obtained by (1) Measurement of Rubber Hardness is shown in FIG. 1. In Comparative Examples 1, 2 and 4, the rubber hardness (Vickers hardness) is lower than the range defined in the present invention, the surface pressure is low, and the sag property is poor. In Comparative Example 3, the rubber hardness is higher than the range defined in the invention and the surface pressure is improved but the sealing property is poor. Also, as described in FIG. 1, in Comparative Example 3, the hardness to a depth direction is 30 N/mm$^2$ (MPa) or more. With regard to the micro-sealing property, a condition that "fastening surface pressure is larger than rubber hardness" is considered to be a necessary condition. Therefore, in Comparative Example 3, the sealing property is bad.

To the contrary, in Examples 1 to 4, the rubber hardness falls within the range defined in the invention, the surface pressure can be secured, the sealing property is satisfactory, and sag is small. That is, even at the same fastening surface pressure as that of the samples of Comparative Examples, the surface pressure directly above the bead can be increased and further the micro-sealing property intrinsic to the rubber layer is not impaired. Therefore, the vibration during engine running and the strain deformation can be reduced and the sealing property can be secured without adopting measures such as a method of increasing the fastening surface pressure with bolts and a method of increasing the surface pressure by changing bead design.

TABLE 1

| Composition | Example 1 | Example 2 | Example 3 | Example 4 | Comparative Example 1 | Comparative Example 2 | Comparative Example 3 | Comparative Example 4 |
|---|---|---|---|---|---|---|---|---|
| Fluorine rubber polymer having Mooney viscosity at 100° C. of 56 | 100 | 100 | 100 | 100 | 100 | | 100 | 100 |
| Fluorine rubber polymer having Mooney viscosity at 100° C. of 28 | | | | | | 100 | | |

TABLE 1-continued

| Composition | Example 1 | Example 2 | Example 3 | Example 4 | Comparative Example 1 | Comparative Example 2 | Comparative Example 3 | Comparative Example 4 |
|---|---|---|---|---|---|---|---|---|
| MT carbon | | | | | 40 | 40 | | |
| SRF carbon | 50 | | | | | | | |
| HAF carbon | | 30 | 30 | 30 | | | 30 | 30 |
| Calcium carbonate | 30 | 30 | 30 | 30 | 30 | 30 | 30 | 0 |
| Magnesium oxide | 3 | 6 | 6 | 3 | 3 | 3 | 6 | 6 |
| Calcium hydroxide | 6 | 18 | 18 | 10 | 6 | 6 | 18 | 18 |
| Bisphenol AF | 6 | 3 | 3 | 3 | 3 | 3 | 3 | 3 |
| Crosslinking accelerator | 1 | 0.5 | 0.5 | 0.5 | 0.5 | 0.5 | 0.5 | 0.5 |
| Amine-based silane coupling agent | 2 | 2 | 4 | 2 | 2 | 2 | 6 | 2 |
| Surface pressure N/mm$^2$ | 106 | 108 | 114 | 102 | 95 | 81 | 114 | 99 |
| Sealing property | Good | Good | Good | Good | Good | Good | Bad | Good |
| Vickers hardness N/mm$^2$ | 20 | 26 | 30 | 20 | 8 | 6 | 37 | 12 |
| Sag property | Good | Good | Good | Good | Bad | Bad | Good | Bad |

While the invention has been described in detail and with reference to specific embodiments thereof, it will be apparent to one skilled in the art that various changes and modifications can be made therein without departing from the spirit and scope thereof.

This application is based on Japanese Patent Application No. 2009-102861 filed on Apr. 21, 2009, the entirety of which is incorporated herein by way of reference.

According to the gasket material of the invention, it is possible to maintain a sealing bead surface at a high surface pressure without changing the engine block design and the gasket design and also possible to absorb flange surface roughness that is an original purpose of the rubber layer.

What is claimed is:

1. A gasket material comprising:
a metal plate; and
a fluorine rubber layer having a Vickers hardness of 15 to 30 N/mm$^2$, being provided on one side or both sides of the metal plate, and being obtained from a fluorine rubber composition containing a fluorine rubber polymer having a Mooney viscosity (100° C.) of 50 to 120;
wherein the fluorine rubber composition further contains:
a polyol compound as a crosslinking agent in an amount of 3 to 6 parts by weight; and
30 to 70 parts by weight of carbon black having an average particle diameter of 25 to 80 nm, 3 to 10 parts by weight of magnesium oxide, 10 to 30 parts by weight of calcium hydroxide, 20 to 50 parts by weight of calcium carbonate, and 2 to 5 parts by weight of an amine-based silane coupling agent all based on 100 parts by weight of the fluorine rubber polymer.

2. A gasket material comprising:
a metal plate; and
a fluorine rubber layer having a Vickers hardness of 15 to 20 N/mm$^2$, being provided on one side or both sides of the metal plate, and being obtained from a fluorine rubber composition containing a fluorine rubber polymer having a Mooney viscosity (100° C.) of 50 to 120;
wherein the fluorine rubber composition further contains:
a polyol compound as a crosslinking agent in an amount of 3 to 6 parts by weight; and
30 to 70 parts by weight of carbon black having an average particle diameter of 25 to 80 nm, 3 to 10 parts by weight of magnesium oxide, 10 to 30 parts by weight of calcium hydroxide, 20 to 50 parts by weight of calcium carbonate, and 2 to 5 parts by weight of an amine-based silane coupling agent all based on 100 parts by weight of the fluorine rubber polymer.

* * * * *